Feb. 15, 1938. W. F. JONES 2,108,587
APPARATUS TO LADEN THE AIR WITH LIQUIDS
Filed Jan. 6, 1937
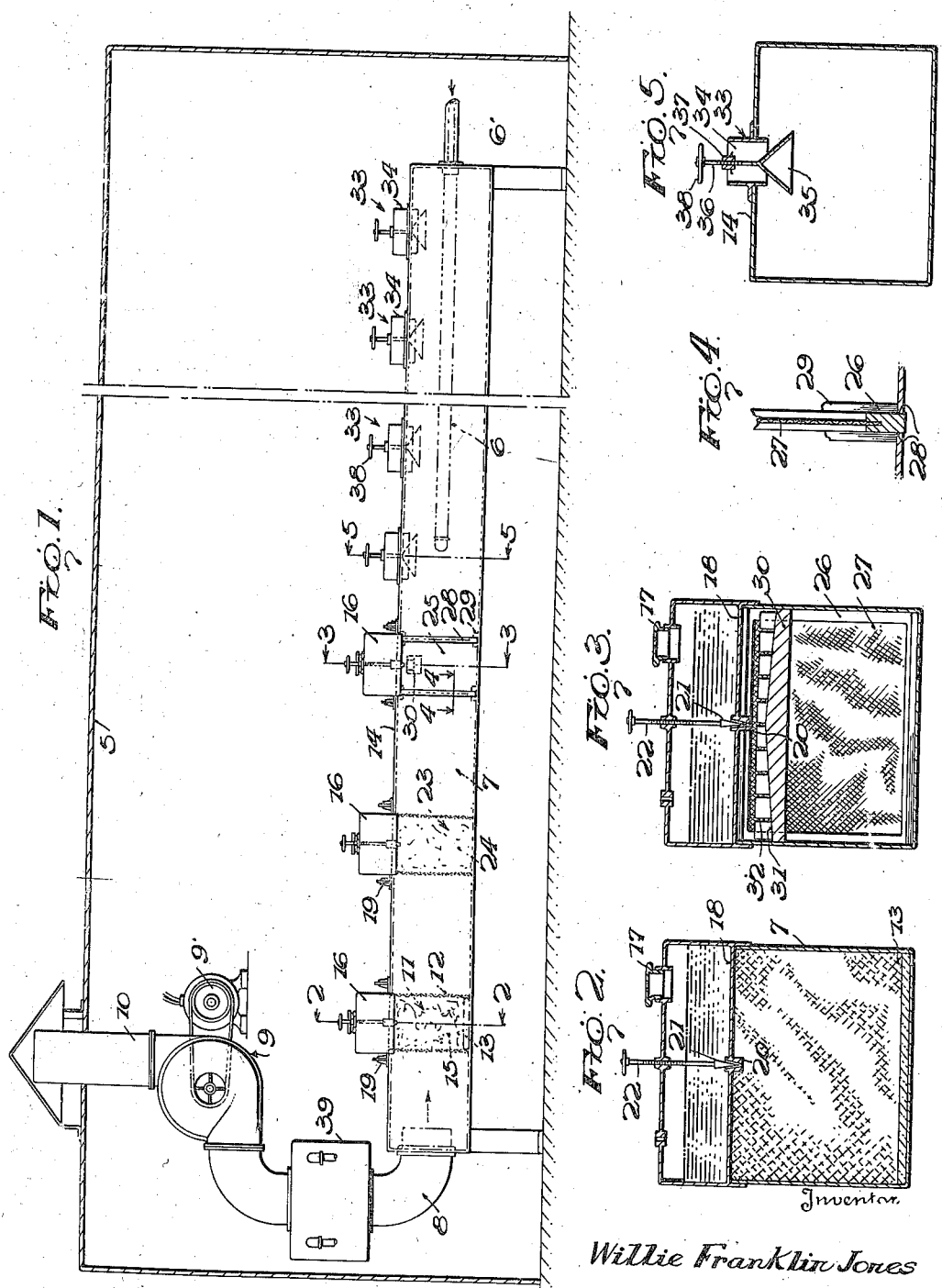
Inventor.
Willie Franklin Jones
By
Attorney Patented Feb. 15, 1938

2,108,587

UNITED STATES PATENT OFFICE 2,108,587

APPARATUS TO LADEN THE AIR WITH LIQUIDS

Willie Franklin Jones, Anderson, S. C.

Application January 6, 1937, Serial No. 119,326

2 Claims. (Cl. 261—13)

My invention relates to apparatus to laden air with a liquid or liquids.

An important object of the invention is to provide such apparatus for use in connection with the heating unit of a room, having cotton arranged therein, so that the room may be artificially heated without injuriously effecting the cotton therein.

Other objects and advantages of the invention will be apparent during the course of the following description.

In the accompanying drawing forming a part of this application and in which like numerals are employed to designate like parts throughout the same, Figure 1 is a side elevation of apparatus embodying my invention, Figure 2 is a transverse section taken on line 2—2 of Figure 1, Figure 3 is a transverse section taken on line 3—3 of Figure 1, Figure 4 is a horizontal section taken on line 4—4 of Figure 1, and, Figure 5 is a transverse vertical section taken on line 5—5 of Figure 1.

In the drawing, wherein for the purpose of illustration is shown a preferred embodiment of my invention, the numeral 5 designates a room or building, such as a carding room, or other room in which cotton is placed. This room has a heating unit 6 therein, to artificially heat the same. This heating unit may be a steam coil, pipe, or radiator, and steam is supplied to the heating unit through a pipe 6', which is preferably heat insulated.

Surrounding this heating unit 6 is a relatively large casing 7, preferably horizontally arranged. This casing is connected with a pipe 8, which leads to the exhaust side of a rotary centrifugal blower 9, driven by a motor 9'. The intake side of the blower communicates with a pipe 10, which leads to the exterior of the room, to receive fresh air, free from steam. This fresh air is forced into the casing 7 and becomes laden with liquid or liquids and is then discharged into the room 5, in a manner to be described.

The numeral 11 designates a basket arranged within the casing 7, and embodying sides 12, formed of wire screen, preferably ⅛ inch mesh. The wire screen sides 12 are soldered to the side walls and bottom of the casing 7. A glass tray 13 is arranged at the bottom of the basket, as shown. The top 14 of the casing 7 over the space between the screen sides 12, is cut away, to provide an opening whereby access may be had to the interior of the space or basket. This basket is filled with porous absorbent material 15, such as absorbent cotton, sponge, or the like. This filler will absorb a liquid and permit the air to pass through the filler, so that the air becomes ladened with the liquid. Arranged above the basket 11 is a tank 16 for holding the desired liquid. This tank has a removable cap 17 so that the liquid may be supplied to the tank and this cap has the usual vent. The tank 16 has a bottom 18 which is arranged to cover and close the opening at the top of the basket and the tank has its bottom slightly overlapping the walls of this opening. The tank is detachably secured to the casing 7 by detachable fastening means 19, of any well-known or preferred type. The tank is provided in its bottom with a valve casing 20, to receive a needle valve 21, carried by a stem 22, extending to the exterior of the tank so that it may be turned. The valve casing 20 is arranged at the top of the basket, and centrally thereof, and serves to supply the liquid, gradually, such as in drops, to the absorbent material 15. The amount of liquid to be thus supplied depends upon the weather conditions and the heat present.

The numeral 23 designates a basket which is identical with the basket 11, except that the glass tray 13 is omitted. The same tank 16 is employed with the same valve to supply the liquid to the center of the basket 23, at its top, so that the liquid is supplied to absorbent porous material 24, filling the basket 23, and this material may be sponge, or absorbent cotton.

The numeral 25 designates a basket, having the same opening at its top as the basket 11, and the same tank 16 with the same valve to control the feeding of the liquid into the top of the basket, at its center. The basket embodies removable sides including rectangular frames 26, covered by cloth 27, such as cheese cloth, and one or more layers are employed. This cheese cloth is boiled to remove the starch. Each side or frame 26 is inserted through a slot 28 in one side of the casing 7, and the frame also operates within guides 29, at its top and bottom. The liquid discharging from the valve 20 within the basket 25 falls upon a distributor 30, preferably formed of wood, and this distributor extends longitudinally of the basket near its top and at its central longitudinal axis. This distributor is held in place by any suitable means and is provided with a longitudinal groove 31, the bottom walls of which are inclined downwardly toward their opposite ends. The distributor also has transverse openings or notches 32 in communication with the groove 31. The basket 25 is preferably not filled with any absorbent material, and the liquid is therefore supplied at spaced intervals to the cavity of the basket between the fabric 27.

The baskets 11, 23 and 25 are arranged in spaced relation from each other and between the air intake end of the casing 7 and the heating unit 6.

The casing 7 covers the heating unit throughout its entire length. The air supplied into the casing can not escape into the room 5 until it has passed through all of the baskets and has become ladened with the liquid or liquids. In order that the air thus treated may finally discharge into the room 5, that portion of the casing 7 which encloses the heating unit 6 is provided with air outlet devices 33, which may be opened in whole or part and closed, when desired. These devices include a valve casing 34, a valve body 35 and an adjustable stem 36 having screw threaded engagement within a stationary bearing 37, and turned by a wheel 38 or the like. These valve devices are spaced longitudinally of the casing 7 for substantially the entire length of the heating unit 6. Any other suitable form of valve devices may be employed.

A refrigerating unit 39 is mounted upon the pipe 8 and is used in warm weather, when the heating unit is not in use and the incoming air would otherwise be too warm.

The operation of the apparatus is as follows:

The needle valves of the several tanks are suitably opened depending upon the weather conditions and the amount of artificial heat supplied from the heating unit 6. The blower 9 is set into action and the air at atmospheric temperature is fed through the pipe 8 and introduced into the casing 7 and travels therein through the several baskets. The first two baskets are filled with the absorbent porous material and hence the air is brought into intimate contact with the liquids. The air also becomes further ladened with the liquid supplied into the basket 25 when passing through this basket. The valve bodies 35 are suitably adjusted. Some of them may be completely closed and others partly or wholly opened or all of them partly or completely opened. The air ladened with the liquids is thus discharged into the room 5 which is artificially heated by the heating unit 6, and this air with the vaporized liquids will properly act upon the cotton within the room, restoring the cotton to its normal condition. The room 5 is heated by the heating unit as the heat readily radiates through the casing 7 which may be formed of sheet metal. This artificial heat would dry the cotton within the room 5 and materially impair its properties for spinning, weaving or the like, and to prevent this, the vaporized liquids are supplied to the interior of the room, which will thus act upon the cotton which is deprived of some of its moisture contents and restore the same to its proper condition.

It is to be understood that the form of my invention herewith shown and described is to be taken as a preferred embodiment of my invention and that various changes in the shape, size, and arrangement of parts may be resorted to, without departing from the spirit of my invention or the scope of the subjoined claims.

Having thus described my invention, I claim:

1. In apparatus for treating cotton, a room within which the cotton is placed, an elongated heat radiating casing arranged within the room, a heating unit arranged within the casing and extending throughout only a portion of the length of the casing, outlet means for the casing arranged near the heating unit, a basket arranged within the casing in advance of the heating unit and including spaced cloth covered frames, a distributor arranged at the top of the space between the frames, said distributor having a longitudinal groove with an inclined bottom extending downwardly toward its free ends, said distributor having notches spaced longitudinally of the groove and in communication therewith and discharging into the space, a tank arranged above the distributor and having an outlet valve arranged near the center of the longitudinal groove, an air supply pipe connected with the casing, and a rotary blower having its outlet end discharging into the air supply pipe.

2. In apparatus for treating cotton, a room within which the cotton is placed, an elongated heat radiating casing arranged within the room, a heating unit arranged within the outlet end portion of the casing, spaced outlet devices for the casing positioned along the heating unit, an air inlet pipe connected with the inlet end of the casing, spaced baskets arranged transversely within the casing between the air inlet pipe and the heating unit, each basket having foraminous sides, a filling of absorbent material within each basket, a tank arranged above each basket and having means to supply a liquid to the filling in a regulated amount, a pair of spaced cloth covered frames extending transversely of the casing between one basket and the heating unit, the frames providing an open space between them, a distributor arranged at the top of the open space and having a longitudinal groove and a plurality of grooves in communication therewith and leading into the open space, a tank above the open space, a valve arranged substantially near the center of the groove and connected with the tank, and a blower having its outlet side in communication with the inlet pipe.

WILLIE FRANKLIN JONES.